(12) United States Patent
Hiienkari et al.

(10) Patent No.: US 12,540,973 B2
(45) Date of Patent: Feb. 3, 2026

(54) MICROELECTRONIC CIRCUIT WITH DYNAMICALLY ADJUSTABLE COVERAGE FOR IN-SITU TIMING EVENT MONITORS

(71) Applicant: Minima Processor Oy, Oulu (FI)

(72) Inventors: Markus Hiienkari, Helsinki (FI); Lauri Koskinen, Helsinki (FI)

(73) Assignee: MINIMA PROCESSOR OY, Oulu (FI)

( * ) Notice: Subject to any disclaimer, the term of this patent is extended or adjusted under 35 U.S.C. 154(b) by 123 days.

(21) Appl. No.: 18/289,962

(22) PCT Filed: Jun. 1, 2021

(86) PCT No.: PCT/FI2021/050396
§ 371 (c)(1),
(2) Date: Nov. 8, 2023

(87) PCT Pub. No.: WO2022/254076
PCT Pub. Date: Dec. 8, 2022

(65) Prior Publication Data
US 2024/0288495 A1 Aug. 29, 2024

(51) Int. Cl.
G01R 31/317 (2006.01)
G06F 11/30 (2006.01)
G06F 11/34 (2006.01)

(52) U.S. Cl.
CPC .... G01R 31/31725 (2013.01); G06F 11/3024 (2013.01); G06F 11/348 (2013.01)

(58) Field of Classification Search
CPC ........ G01R 31/31725; G01R 31/31727; G06F 11/3024; G06F 11/348; G06F 11/3419;
(Continued)

(56) References Cited

U.S. PATENT DOCUMENTS 4,736,351 A * 4/1988 Oliver ............... G01R 31/2839
714/724
5,077,488 A * 12/1991 Davis ..................... G05F 1/466
327/540
(Continued)

OTHER PUBLICATIONS

Written opinion of the international Search Authority (Year: 2022).*
(Continued)

*Primary Examiner* — Christopher P Mcandrew
(74) *Attorney, Agent, or Firm* — Carroll, Hoette & Butscher LLC; Christopher R. Carroll

(57) ABSTRACT

The performance of an adaptive microelectronic circuit is at least partly configurable by selecting a value of an operating parameter. On processing paths, data inputs of register units are coupled to outputs of respective logic units for temporarily storing output values of said logic units. A plurality of timing event monitors respond to a digital value at a data input of a monitored register unit changing later than an allowable time limit by generating a timing event observation signal. The plurality of timing event monitors form a plurality of monitor groups, each monitor group being coupled to a branch of a triggering signal tree for coupling a monitor-group-specific triggering signal to the monitor group independently of other monitor groups. A control unit selectively allows or disables the propagation of the respective triggering signals into said branches of the triggering signal tree.

11 Claims, 2 Drawing Sheets

(58) Field of Classification Search
CPC ...... G06F 11/30; G06F 11/34; G06F 2201/81; H03K 5/19
USPC .................................................... 324/762.01
See application file for complete search history.

(56) References Cited

U.S. PATENT DOCUMENTS

| | | | | |
|---|---|---|---|---|
| 7,054,205 | B2* | 5/2006 | Buhler | G11C 7/22 365/194 |
| 7,142,998 | B2* | 11/2006 | Watson, Jr. | H03K 5/1534 702/89 |
| 9,632,141 | B2* | 4/2017 | Vahidsafa | G06F 11/263 |
| 2004/0199842 | A1* | 10/2004 | Sartschev | G01R 31/3016 714/731 |
| 2005/0229127 | A1* | 10/2005 | Warren | G06F 30/3312 716/108 |
| 2007/0025453 | A1* | 2/2007 | Terashima | H04L 25/14 375/257 |
| 2007/0124634 | A1 | 5/2007 | Shibuya | |
| 2016/0131711 | A1* | 5/2016 | Vahidsafa | G01R 31/31726 324/762.03 |
| 2019/0004565 | A1* | 1/2019 | Nelson | G06F 1/12 |
| 2020/0099372 | A1* | 3/2020 | Turnquist | H03K 5/1534 |
| 2020/0301464 | A1* | 9/2020 | Kamiya | G06F 1/04 |

OTHER PUBLICATIONS

Mihir R. Choudhury et al. "Time-Borrowing Circuit Designs and Hardware Prototyping" IEEE Transactions on Computers, vol. 63, No. 2, Feb. 2018, pp. 497-509 (13 pages).
Miro-Panades et al. "Fine-Grain Variation-Aware Dynamic Vdd-Hopping AVFS Architecture on a 32 nm GALS MPSoC" IEEE Journal of Solid-State Circuits, vol. 49, No. 7, Jul. 2014, pp. 1475-1486 (12 pages).
International Search Report and Written Opinion of the International Searching Authority mailed Mar. 8, 2022 for International application No. PCT/FI2021/050396 (18 pages).
Choudhury, M. et al. Time-Borrowing Circuit Designs and Hardware Prototyping for Timing Error Resilience. In: IEEE Transactions on Computers Aug. 2, 2012, vol. 63, No. 2, pp. 497-509.
Zhang, Y. et al. iRazor: Current-Based Error Detection and Correction Scheme for PVT Variation in 40-nm ARM Cortex-R4 Processor. In: IEEE Journal of Solid-State Circuits Oct. 6, 2017, vol. 53, No. 2, pp. 619-631.
Miro-Panades, I. et al. A Fine-Grain Variation-Aware Dynamic Vdd-Hopping AVFS Architecture on a 32 nm GALS MPSoC. In: IEEE Journal of Solid-State Circuits Apr. 28, 2014, vol. 49, No. 7, pp. 1475-1486.
Alpert, C. et al. Placement: Hot or Not?. In: Proceedings of the 2012 IEEE/ACM International Conference on Computer-Aided Design (ICCAD) Nov. 5, 2012, pp. 283-290.

\* cited by examiner

MICROELECTRONIC CIRCUIT WITH DYNAMICALLY ADJUSTABLE COVERAGE FOR IN-SITU TIMING EVENT MONITORS

CROSS-REFERENCE TO RELATED APPLICATIONS

This application is a national phase of and claims priority to PCT/FI2021/050396 (filed 1 Jun. 2021), the entire disclosure of which is incorporated herein by reference.

BACKGROUND

Technical Field

The invention is generally related to the technology of microelectronic circuits that have built-in monitoring capability for timing events on processing paths. In particular, the invention concerns a way in which the energy consumption of the timing event monitoring circuitry can be optimized during operation.

State of Art

Microelectronic circuits such as microprocessors, microcontrollers, memory circuits, and the like comprise large numbers of processing paths that consist of alternating logic units and register units. The logic units perform logic operations, the intermediate results of which are temporarily stored in the register units that may have the form of latches or flip-flops. Clock signals set the pace of operation, for example so that an intermediate result must be ready at the output of a logic unit before the next rising or falling edge of a clock signal to become properly stored in the respective register unit. A timing event occurs if the output of the logic unit changes too late in relation to the decisive edge in the clock signal.

Adaptive microelectronic circuits are devices the operation of which can be changed by changing the value (s) of one or more operating parameters. Typical operating parameters of adaptive microelectronic circuits are operating voltage (or voltages, in case there are more than one) and clock frequency (or frequencies, in case there are more than one). The power consumption of a microelectronic circuit is roughly proportional to the square of the operating voltage, which means that lowering the operating voltage may enable achieving significant savings in power.

Lowering the operating voltage of a microelectronic circuit tends to increase propagation delays. Timing events may result e.g., from an attempt to minimize the energy consumption of the circuit by lowering the operating voltage of the whole circuit or some voltage domain therein during operation. It is important to detect the occurrence of timing events so that a controlling entity may take corrective action, for example by increasing voltage, lowering clock frequency, discarding possibly incorrect results and so on. The designer of a microelectronic circuit may place so-called timing event monitors at various locations within the circuit. A timing event monitor produces a timing event signal when it detects a timing event in a respective monitored register unit.

Every circuit element in the microelectronic circuit consumes power when operating, and the timing event monitors are no exception. Placing a large number of timing event monitors in a microelectronic circuit thus involves a paradox: while it may help in accurately finding the exact balance between operating voltage and clock frequency for most energy-efficient operation at each moment, it simultaneously increases the overall energy consumption because also the timing event monitors draw power. At the stage of designing the circuit it is difficult to predict the optimal number and placing of timing event monitors, because every circuit may eventually end up in different kind of use, calling for slightly different kind of dynamic optimization. Even variations in silicon quality and manufacturing conditions have an effect, so that microelectronic circuits from one production batch may need different kind of optimization during use than those from some other batch. This kind of factors often make designers use an overly pessimistic number of timing event monitors in a circuit design, with the disadvantageous result of sub-optimal energy efficiency.

It would be desirable to find a way to ensure that a microelectronic circuit comprises sufficient timing event monitors placed at appropriate locations while simultaneously making it possible to prevent consuming excessive amounts of energy in such timing event monitors.

BRIEF SUMMARY

According to a first aspect there is provided an adaptive microelectronic circuit, the performance of which is at least partly configurable by selecting a value of an operating parameter. The microelectronic circuit comprises a plurality of processing paths, on which data inputs of register units are coupled to outputs of respective logic units for temporarily storing output values of said logic units. The microelectronic circuit comprises a plurality of timing event monitors, each configured to respond to a digital value at a data input of a monitored register unit changing later than an allowable time limit by generating a timing event observation signal, wherein said allowable time limit is defined by at least one triggering edge of at least one triggering signal coupled to the respective register unit. Said plurality of timing event monitors form a plurality of monitor groups, each monitor group being coupled to a branch of a triggering signal tree for coupling a monitor-group-specific triggering signal to the timing event monitors of the monitor group independently of other monitor groups. The microelectronic circuit comprises a control unit configured to selectively allow or disable the propagation of the respective triggering signals into said branches of the triggering signal tree.

According to an embodiment, said timing event monitors belong to said monitor groups based on a length of a processing path that precedes the respective timing event monitor without other timing event monitors. This involves the advantage that the probability of timing events occurring in each monitor group can be predicted in a systematic way with reasonable certainty.

According to an embodiment, the microelectronic circuit comprises two or more voltage domains, each such voltage domain being characterized by a domain-specific operating voltage. The timing event monitors may then belong to said monitor groups based on the location of the respective timing event monitor on a voltage domain and/or the location on a voltage domain of a point of a processing path that precedes the respective timing event monitor. This involves the advantage that the effect of the domain-specific operating voltages on the probability of timing events detected by the monitors can be handled in a logical and intuitive way.

According to an embodiment, the timing event monitors belong to said monitor groups based on a calculated estimate of an amount of data that will flow through a processing path, a register unit of which the respective timing event monitor is configured to monitor. This involves the advantage that run-time effects such as the amount of data can be taken into account in deactivating and reactivating the timing event monitors of the monitor groups.

According to an embodiment, the timing event monitors belong to said monitor groups based on their physical location within the microelectronic circuit. This involves the advantage that the location-dependent circumstances that affect the occurrence of timing events can be accounted for by selectively deactivating and reactivating appropriate monitor groups.

According to an embodiment, the timing event monitors belong to said monitor groups based on their location within functional units of the microelectronic circuit. This involves the advantage that the practice of selectively deactivating and reactivating timing event monitors groupwise can be extended to functional units, even those functional units that otherwise appear as "black boxes" in the circuit design. This method can be also extended within the functional units, for example pipeline stages within a unit.

According to an embodiment, the timing event monitors belong to said monitor groups based on their applied detection window type. The detection window type refers to the location on time axis of a detection window applied by the respective timing event monitor in relation to the triggering edge that defines the allowable time limit for changes in data input of the respective monitored register unit. This involves the advantage that the monitor groups can be selectively deactivated and reactivated based on which detection window types are the most appropriate in each circuit and in each run-time situation.

According to an embodiment, the timing event monitors of at least one monitor group are configured to derive information equivalent to the timing of the respective detection window from information produced by one or more process-, voltage-, or temperature monitors and convert said information into timing of the respective detection window. Such converting may be done for example by applying an equation, the execution of which has been built and/or programmed into the respective part (s) of the microelectronic circuit. This involves the advantage that PVT-related factors can be made to directly affect the characteristics of timing event detection.

According to an embodiment, the microelectronic circuit comprises a variable delay element in at least one of said branches of the triggering signal tree. This enables controllably delaying a triggering signal propagating into the respective branch of the triggering signal tree by a selected amount of variable delay. This involves the advantage that the location of detection windows in relation to the triggering signal to the respective register units can be controlled per monitor group in a very practical way.

According to an embodiment, the control unit is configured to monitor an overall rate of timing event observation signals received from timing event monitors of the microelectronic circuit. The control unit may then be configured to selectively allow or disable the propagation of the respective triggering signals into said branches of the triggering signal tree based on said overall rate of timing event observation signals. This involves the advantage that the amount of power used to perform timing event detection can be controlled dynamically according to how much such timing event detection is needed in each case.

According to an embodiment, the control unit is configured to monitor separately the rate of timing event observation signals received from the timing event monitors of different monitor groups. The control unit may then be configured to selectively disable the propagation of triggering signals to the respective branch of the triggering signal tree in response to the rate of timing event observation signals received from the respective monitor group being below a predetermined threshold. This involves the advantage that the amount of power used to perform timing event detection can be controlled dynamically according to how much such timing event detection is needed in each case.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
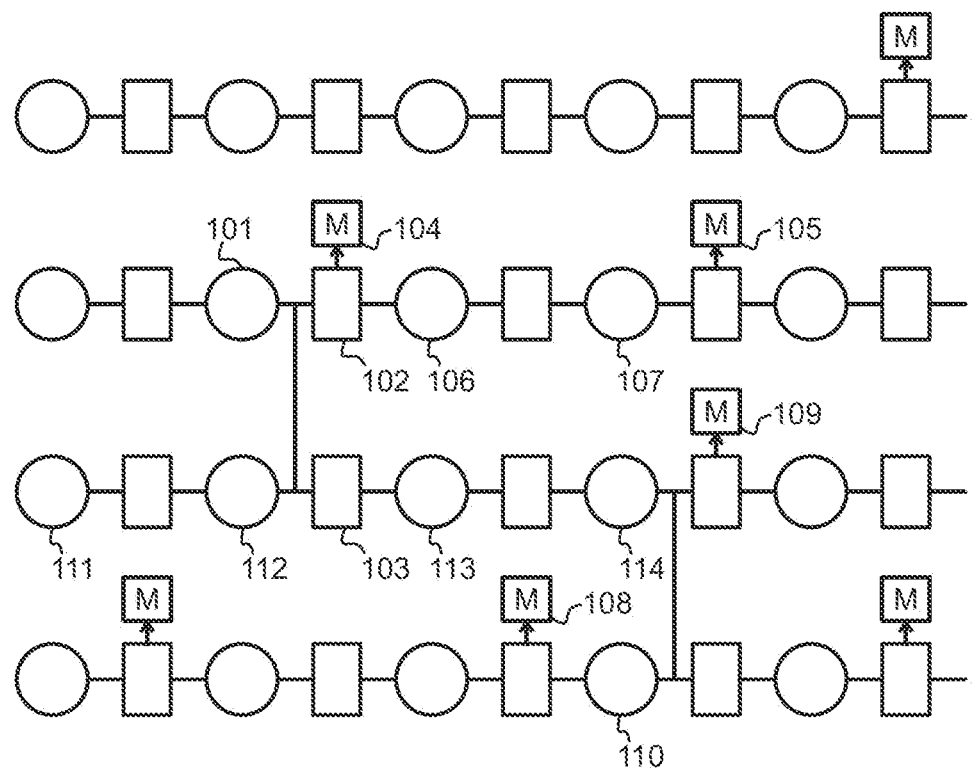
FIG. 1 illustrates the use of timing event monitors on register units of processing paths.

FIG. 1 illustrates a part of a microelectronic circuit, which may be for example a microprocessor or microcontroller. Here it is further assumed that the microelectronic circuit is a so-called adaptive microelectronic circuit. This means that its performance is at least partly configurable by selecting a value of an operating parameter. Performance can be evaluated in various aspects like power consumption, operations performed by second, number of error situations per unit time, or the like.

Typical operating parameters, the values of which can be selected for the purpose of configuring performance, include but are not limited to the operating voltage and/or clock frequency that is available for at least some of the internal components in the microelectronic circuit. A selected value of an operating parameter may be the same for the whole adaptive microelectronic circuit. Alternatively, the internal components of the microelectronic circuit may form groups and/or functional blocks, so that values of at least some operating parameters may be the selected per group and/or functional block.

In general, lowering the value of operating voltage reduces power consumption but slows down the transitions between logical states, which in turn means that incorrect values may become stored in registers. Decreasing clock frequency reduces energy consumption and decreases the risk of storing incorrect values, but simultaneously it reduces data throughput. Random factors such as impurities and crystalline irregularities in semiconductor materials, inaccuracies in manufacturing, and the like mean that the way in which optimal performance is achieved varies from circuit to circuit. Runtime factors like variations in required amount of processing and the distribution of processing operations among the functional blocks of the circuit cause dynamically changing needs in configuring performance.

The microelectronic circuit, a part of which is shown in FIG. 1, comprises a plurality of processing paths, which consist of logic units followed by register units. Logic units are shown as circles and register units as rectangles in FIG. 1. Data inputs of the register units are coupled to outputs of respective logic units for storing output values of these logic units. This storing takes place at a pace determined by a triggering signal, also commonly referred to as the clock frequency signal or simply clock signal. The processing paths form an interconnected network. In FIG. 1 this is schematically shown for example so that the output of logic unit 101 is coupled to the data inputs of both register units 102 and 103.

The microelectronic circuit comprises a plurality of timing event monitors, of which the timing event monitor 104 is shown as an example. A timing event monitor operates together with an associated register unit, here register unit 102. It is configured to respond to a timing event, i.e., a situation in which a digital value at the data input of the monitored register unit changes later than an allowable time limit, by generating a timing event observation (TEO) signal.

The allowable time limit is defined by at least one triggering edge of at least one triggering signal that is coupled to the respective register unit. Simplified, if the rising edges of the triggering signal are the triggering edges, the allowable time limit is the moment at which the rising value of the triggering signal begins to affect the storing operation in the register unit. Depending on the circuit technology used, the exact definition of the allowable time limit may be something else, like shortly before or shortly after the rising edge of the triggering signal. The triggering edge may also be a falling edge in the triggering signal, or both rising and falling edges may act as triggering edges.

A timing event monitor detects when the data input to the respective register unit changes in respect to the triggering edge. For this purpose, the timing event monitor applies a detection window, which is a time interval defined in relation to the triggering edge. Various types of detection windows are known, with different implications to the need of error correction. As an example, the detection window may be located before the triggering edge. Additionally or alternatively, the register unit may have a grace period after the triggering edge where a change in data input still does not cause an error, and the detection window may cover the grace period. The grace period may be based on the use of a latch or a time-borrowing flip-flop as the register unit. A detected change in input data within such type of a detection window does not require error correction, because the correct value of the input data became stored. Another example of a detection window type is one that extends over periods where a change in input data will result in storing an incorrect value in the register unit. Such detection window types require the microelectronic circuit to comprise an error correction mechanism.

For the purpose of the present description it is sufficient to assume that there is an unambiguous way of defining the allowable time limit in relation to the corresponding edges in the triggering signal, and that the monitor circuits are built so that they generate the TEO signal if the incoming data changes later than that.

The exact way in which the monitor circuits are implemented is not essential to this description. Examples of suitable monitor circuit implementations can be found for example in patent publications PCT/FI2017/050290, PCT/FI2017/050475, and PCT/FI2020/050108.

An aspect of the present description is that the plurality of timing event monitors form a plurality of monitor groups in the microelectronic circuit. These groups can be defined in a variety of ways. One possible principle of forming the groups is to categorize the timing event monitors based on how likely a timing event will occur in the register unit they monitor. This likeliness may be measured in a variety of ways. In FIG. 1, the timing event monitors may belong to the monitor groups based on a length of a processing path that precedes the respective timing event monitor without other timing event monitors. For example, timing event monitor 105 has two logic units 106 and 107 (and an intermediate register unit) between it and the preceding timing event monitor 104 on the same processing path.

Here the cross-linked network nature of the processing paths must be considered. For example, between timing event monitors 108 and 109 there is only one logic unit 110, if one considers the bridging connection between the two lowest horizontal lines in FIG. 1. However, following just the second lowest horizontal line, there are at least four logic units 111, 112, 113, and 114 (and the intermediate register units) between the timing event monitor 109 and the preceding timing event monitor on the same processing path. Thus, comparing timing event monitors 105 and 109, timing event monitor 109 should be categorized as having a longer processing path preceding it without other timing event monitors.

Figure 2:
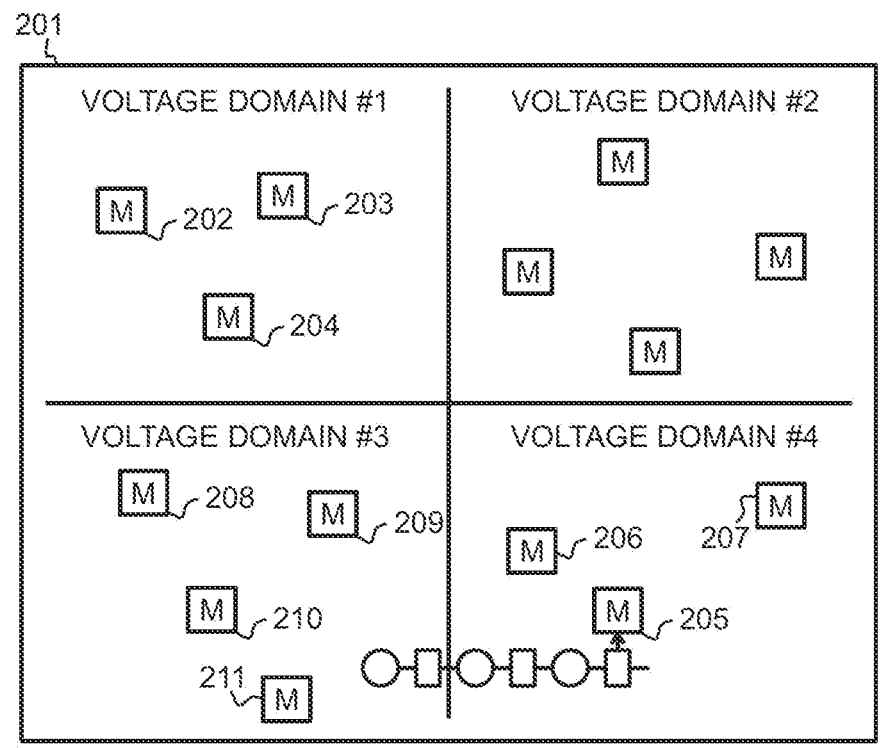
FIG. 2 illustrates the location of timing event monitors in different voltage domains.

FIG. 2 illustrates an example in which the microelectronic circuit comprises two or more voltage domains, which may form the basis of grouping the timing event monitors. Here the schematically shown microelectronic circuit 201 is divided into four voltage domains. A voltage domain is characterized by a domain-specific operating voltage. In other words, a voltage domain is defined as a part of the microelectronic circuit that shares the same operating voltage, the value of which can be dynamically selected independently of (or at least with some freedom in relation to) the operating voltages selected for other voltage domains. Showing the voltage domains as clearly distinct, rectangular geometric regions in FIG. 2 is a graphical simplification: in reality, the voltage domains may have a complicated, interwoven geometry.

The timing event monitors may belong to monitor groups based on their location on a voltage domain. For example, in FIG. 2 the timing event monitors 202, 203, and 204 may belong to the same monitor group because they are all located on the first voltage domain of the microelectronic circuit 201. As a non-excluding alternative, the timing event monitors may belong to monitor groups based on the location—on a voltage domain—of a point of a processing path that precedes the respective timing event monitor. In FIG. 2, timing event monitor 205 may belong to the same monitor group with timing event monitors 206 and 207, because they are all located on the fourth voltage domain. Additionally or alternatively, timing event monitor 205 may belong to the same monitor group with timing event monitors 208, 209, 210, and 211, because the processing path that precedes it includes a point located on the third voltage domain.

When a timing event monitor is located on a particular voltage domain, how likely a timing event will occur in the register unit it monitors depends very much on the operating voltage value selected for that voltage domain. Similarly, when one considers a point of a processing path that precedes the respective timing event monitor, the prevailing operating voltage at that point has an effect on how likely a timing event will occur in the monitored register unit.

Additionally or alternatively, the timing event monitors may belong to monitor groups based on a calculated estimate of an amount of data that will flow through a processing path, a register unit of which the respective timing event monitor is configured to monitor. Such estimates can be calculated using simulation software during the design process of the microelectronic circuit. The calculation of the estimate may take into account an intended use of the microelectronic circuit.

Additionally or alternatively, the timing event monitors may belong to monitor groups based on their physical location within the microelectronic circuit. Many kinds of structural and organizational features of the microelectronic circuit may have an effect in such a case. As an illustrative example, circuit elements located close to a point at which significant amounts of heat will be generated are likely to experience higher temperatures during operation than circuit elements located far from such points. The higher operating temperature may affect the likelihood of timing events that occur in monitored register units.

Figure 3:
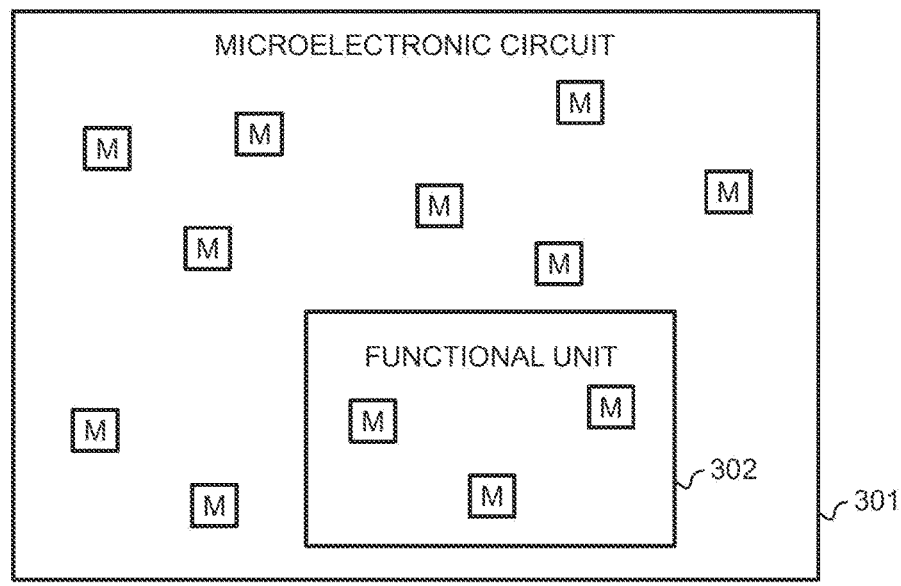
FIG. 3 illustrates the provision of a functional unit with internal timing event monitors in a microelectronic circuit.

Additionally or alternatively, the timing event monitors may belong to monitor groups based on their location within functional units of the microelectronic circuit. An example is shown in FIG. 3, where the microelectronic circuit 301 comprises a functional unit 302. A functional unit means a group of circuit elements that all serve a particular, distinct function within the microelectronic circuit. An example of a functional unit 302 is an integrated memory that forms a part of the microelectronic circuit 301. It is common for designers of a microelectronic circuits to incorporate functional units as blocks that have been designed separately. From the viewpoint of the other circuit elements, such a functional unit may appear as a "black box" that interfaces with the other circuit elements through a set of inputs and outputs and implements the desired function but is otherwise inaccessible when it comes to operation on the level of individual logic units or register units. In such a case it may be advantageous to make all timing event monitors located in the functional unit constitute a distinct monitor group that has its own branch of the triggering signal tree within the functional unit. The monitors within these functional units can also derive information equivalent to timing by other means, e.g., PVT monitors, and convert that to timing, by using an equation, for example.

Additionally or alternatively, the timing event monitors may belong to monitor groups based on their applied detection window type. Here the term detection window type refers to the location on time axis of the detection window in relation to the triggering edge that defines the allowable time limit for changes in data input of the monitored register unit.

Figure 4:
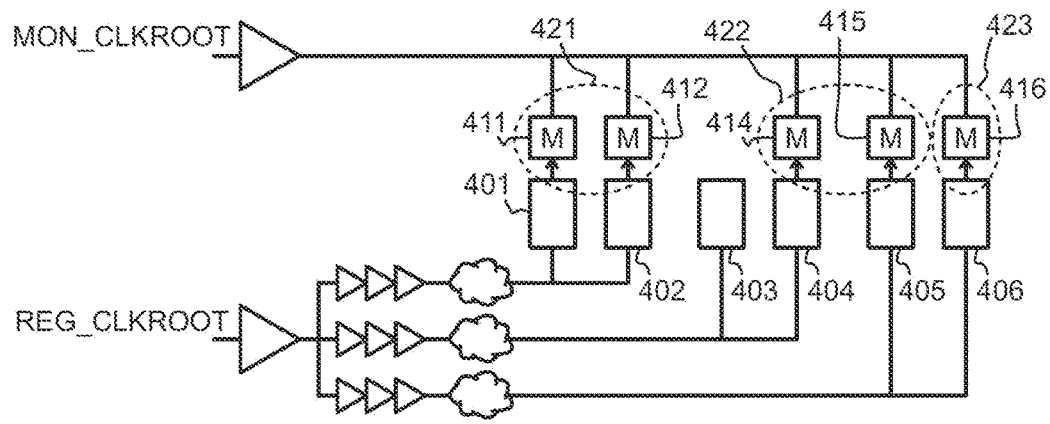
FIG. 4 illustrates a grouping of timing event monitors.
Figure 5:
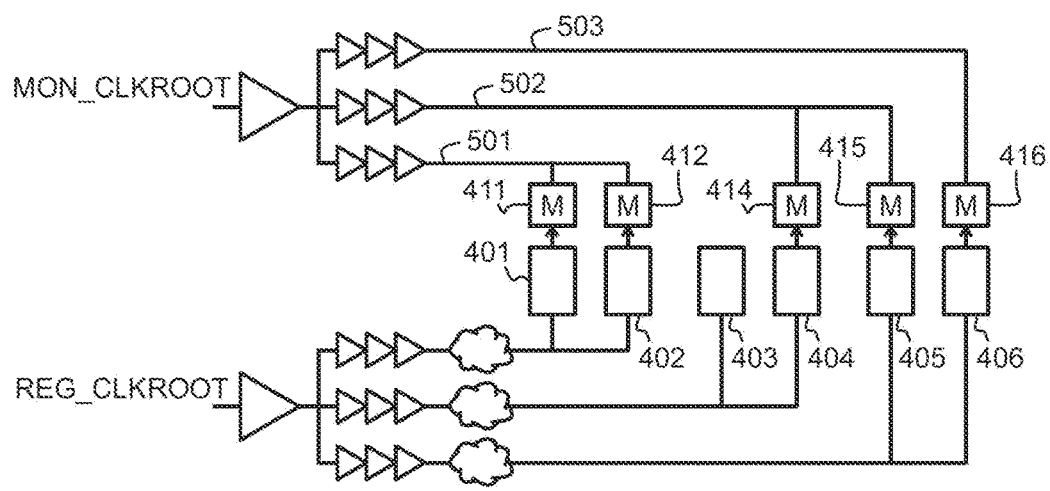
FIG. 5 illustrates a way of forming triggering signals.

FIGS. 4 and 5 illustrate the concepts of forming monitor groups and setting up a triggering signal tree with branches for monitor groups. FIG. 4 shows schematically a step in designing a microelectronic circuit. There are numerous register units in the design, of which the register units 401, 402, 403, 404, 405, and 406 are shown in FIG. 4. There is a triggering signal tree that delivers triggering signals to the register units. In FIG. 4 the root of said triggering signal tree is named the REG_CLKROOT. The schematically illustrated register units 401 to 406 belong to the branches of the triggering signal tree in pairs.

Five of the six register units are equipped with respective timing event monitors 411, 412, 414, 415, and 416. In FIG. 4 there is a separate root MON_CLKROOT for the triggering signals that will go to the timing event monitors.

The dashed ovals in FIG. 4 show how three distinct monitor groups 421, 422, and 423 have been identified. Timing event monitors 411 and 412 belong to monitor group 421, timing event monitors 414 and 415 belong to monitor group 422, and timing event monitor 416 alone constitutes monitor group 423. The forming of monitor groups may proceed for example so that the circuit design is subjected to Static Timing Analysis (STA), which gives the estimated slack for each of the monitored register units 401, 402, 404, 405, and 406. The estimated slack range may then be divided into intervals, such as equally sized intervals in terms of the magnitude of the estimated slack. As an example, the STA may indicate that register units 401 and 402 are likely to experience slack of 0 to 20% of a clock cycle; register units 404 and 405 are likely to experience slack of 20 to 40% of a clock cycle; and register unit 406 is likely to experience slack of 40 to 60% of a clock cycle. This would then divide the timing event monitors into the groups shown in FIG. 4.

The estimated slack is not necessarily a single value but a statistical estimate that appears as a probability distribution of possible slack values. Dividing the timing event monitors into groups on the basis of estimated slack may be based on statistical descriptor values of such probability distributions, like arithmetic mean, median, variance, or the like, or on any combinations of these.

An alternative way of utilizing STA in forming the monitor groups is one where the monitor-equipped register units are arranged into numbered order by their calculated slack, and this ordered list is then divided into groups so that equally many register units end up in each group. Their respective timing event monitors then go into monitor groups in accordance with this division. Also in this approach, statistical descriptor values may be used instead of or in addition to some individual calculated (i.e., estimated) slack values.

At a subsequent step in the design process, a triggering signal tree is set up with a dedicated branch for each monitor group. In FIG. 5 the timing event monitors 411 and 412 of the first monitor group are coupled to a first branch 501 of the triggering signal tree that links them to the root MON_CLKROOT. The timing event monitors 414 and 415 of the second monitor group are coupled to a second branch 502 of the triggering signal tree, and the timing event monitor 416 of the third monitor group is coupled to a third branch 503 of the triggering signal tree.

The microelectronic circuit is then made to comprise a control unit that is configured to selectively allow or disable the propagation of the respective triggering signals into the branches 501, 502, and 503 of the triggering signal tree. Such technique can be generally described as clock gating. A clock gate is added at the root of each branch of the triggering signal tree that delivers the triggering signal to the timing event monitors. These clock gates can dynamically gate the triggering signal downstream of them, thus stopping the timing event monitors on that branch and saving power. Alternatively, this can be achieved with a control block which takes the timing event signals as inputs and produces the appropriate output signals that allow or disable the propagation of the respective triggering signals into the branches of the triggering signal tree.

As an example, it may be assumed—as was done above—that STA gave an estimated slack of 0 to 20% of the clock cycle for the register units 401 and 402. A relatively small estimated slack means that timing events are not very likely to occur in these register units. The control unit may monitor the overall rate of TEO signals it receives from all timing event monitors of the microelectronic circuit. If this rate is low, it probably means that timing events only occur in those register units in which their probability of occurrence is highest, and not e.g., in register units 401 or 402. Under such circumstances the control unit may disable the propagation of any triggering signals into branch 501 of the triggering signal tree that serves the timing event monitors. As a result, the timing event monitors 411 and 412 become inactive. If, at a later moment of time, the overall rate of received TEO signals increases above some predetermined limit, the control unit may enable again the propagation of triggering signals into branch 501. As a result, the timing event monitors 411 and 412 become activated and begin monitoring also the lowest-probability timing events in register units 401 and 402.

This same operating principle may apply in all branches of the triggering signal tree that delivers the triggering signal to the timing event monitors. Predetermined limit values of the overall rate of TEO signals may have been defined for the control units, thus governing its operation in disabling and enabling the propagation of triggering signals into various branches of the triggering signal tree. Additionally or alternatively, the control unit may operate dynamically so that an increasing overall rate of received TEO signals results in activating more monitor groups, and a decreasing overall rate of received TEO signals results in activating fewer monitor groups, irrespective of the absolute level of the rate.

According to an embodiment, the control unit is capable of monitoring separately the rate of TEO signals received from the timing event monitors of different monitor groups. In such a case, the control unit may shut down a monitor group (i.e., selectively disable the propagation of triggering signals to the respective branch of the triggering signal tree) if the rate of TEO signals received from the respective monitor group is below a predetermined threshold. The control unit may reactivate such a monitor group every now and then according to some predefined schedule, in order to check whether the monitor group still produces the TEO signals at a lower-than-threshold rate. Additionally or alternatively, the control unit may reactivate such a monitor group in response to the rate of TEO signals received from the other monitor groups increasing beyond some predefined threshold.

Additionally or alternatively, the microelectronic circuit may be made to comprise a variable delay element in at least one of the branches 501, 502, or 503 of the triggering signal tree that delivers the triggering signal to the timing event monitors. Such one or more variable delay elements may then serve to controllably delay a triggering signal that propagates into the respective branch of the triggering signal tree, by a selected amount of variable delay. This way the location of the detection window applied by the timing event monitors can be changed by monitor group. The location of the detection window is defined with reference to triggering edges in that (or those) triggering signal (s) that control the operation of the actual register units. Controllably adding delay to a branch of the triggering signal tree that delivers the triggering signal to the timing event monitors shifts the detecting window later in all timing event monitors of the respective monitor group.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A microelectronic circuit that is an adaptive microelectronic circuit at least partly configurable by selecting a value of an operating parameter, the microelectronic circuit comprising:
a plurality of processing paths on which data inputs of register units are coupled to outputs of respective logic units for temporarily storing output values of said logic units;
a plurality of timing event monitors, each of the timing event monitors configured to respond to a digital value at a data input of a respective monitored register unit changing later than an allowable time limit by generating a timing event observation signal, wherein said allowable time limit is defined by at least one triggering edge of at least one triggering signal coupled to the respective register unit, the plurality of timing event monitors forming a plurality of monitor groups, each of the monitor groups being coupled to a branch of a triggering signal tree for coupling a monitor-group-specific triggering signal to the timing event monitors of the monitor group independently of other monitor groups; and
a control unit configured to selectively allow or disable propagation of the respective triggering signals into said branches of the triggering signal tree.

2. A microelectronic circuit according to claim 1, wherein said timing event monitors belong to said monitor groups based on a length of a processing path that precedes the respective timing event monitor without other timing event monitors.

3. A microelectronic circuit according to claim 1, wherein the microelectronic circuit comprises two or more voltage domains, each of the voltage domains being characterized by a domain-specific operating voltage, and the timing event monitors belong to said monitor groups based on at least one of: a location of the respective timing event monitor on a voltage domain or a location on a voltage domain of a point of a processing path that precedes the respective timing event monitor.

4. A microelectronic circuit according to claim 1, wherein said timing event monitors belong to said monitor groups based on a calculated estimate of an amount of data that will flow through a processing path, a register unit of which the respective timing event monitor is configured to monitor.

5. A microelectronic circuit according to claim 1, wherein said timing event monitors belong to said monitor groups based on a physical location of said timing event monitors within the microelectronic circuit.

6. A microelectronic circuit according to claim 1, wherein said timing event monitors belong to said monitor groups based on a location of said timing event monitors within functional units of the microelectronic circuit.

7. A microelectronic circuit according to claim 1, wherein said timing event monitors belong to said monitor groups based on a detection window type applied by each said timing event monitor respectively, wherein the detection window type refers to a location on a time axis of a detection window applied by the respective timing event monitor in relation to the triggering edge that defines the allowable time limit for changes in data input of the respective monitored register unit.

8. A microelectronic circuit according to claim 1, wherein timing event monitors of at least one monitor group are configured to derive information equivalent to the timing of a respective detection window from information produced by one or more process-, voltage-, or temperature monitors and convert said information into timing of the respective detection window.

9. A microelectronic circuit according to claim 1, comprising a variable delay element in at least one of said branches of the triggering signal tree, for controllably delaying a triggering signal propagating into the respective branch of the triggering signal tree by a selected amount of variable delay.

10. A microelectronic circuit according to claim 1, wherein said control unit is configured to:
- monitor an overall rate of timing event observation signals received from timing event monitors of the microelectronic circuit, and
- selectively allow or disable the propagation of the respective triggering signals into said branches of the triggering signal tree based on said overall rate of timing event observation signals.

11. A microelectronic circuit according to claim 1, wherein said control unit is configured to:
- monitor separately a rate of timing event observation signals received from the timing event monitors of different monitor groups, and
- selectively disable the propagation of triggering signals to the respective branch of the triggering signal tree in response to the rate of timing event observation signals received from the respective monitor group being below a predetermined threshold.

* * * * *